United States Patent
Li (10) Patent No.: US 10,274,765 B2
(45) Date of Patent: Apr. 30, 2019

(54) OPTICAL WAVEGUIDE DISPLAY DEVICE, MANUFACTURING METHOD AND DRIVING METHOD THEREOF

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/647,600

(22) Filed: Jul. 12, 2017

(65) Prior Publication Data

US 2018/0047901 A1 Feb. 15, 2018

(30) Foreign Application Priority Data

Aug. 11, 2016 (CN) .......................... 2016 1 0658991

(51) Int. Cl.
| | |
|---|---|
| *G02F 1/1335* | (2006.01) |
| *G02F 1/13* | (2006.01) |
| *G02F 1/1334* | (2006.01) |
| *H01L 51/52* | (2006.01) |

(52) U.S. Cl.
CPC .......... *G02F 1/1326* (2013.01); *G02F 1/1334* (2013.01); *H01L 51/5275* (2013.01); *G02F 1/133615* (2013.01)

(58) Field of Classification Search
None
See application file for complete search history.

(56) References Cited

U.S. PATENT DOCUMENTS

2015/0055055 A1* 2/2015 Ebisui .................. G02F 1/1334
349/61

FOREIGN PATENT DOCUMENTS

| CN | 1253302 A | 5/2000 |
|---|---|---|
| CN | 201110922 Y | 9/2008 |
| CN | 101846270 A | 9/2010 |
| CN | 103293744 A | 9/2013 |
| CN | 103717961 A | 4/2014 |
| CN | 104303099 A | 1/2015 |

OTHER PUBLICATIONS

First Office Action for Chinese Patent Application No. 201610658991.1 dated Nov. 2, 2018.

* cited by examiner

*Primary Examiner* — Richard H Kim
(74) *Attorney, Agent, or Firm* — Calfee, Halter & Griswold LLP (57) ABSTRACT

An optical waveguide display device includes a substrate and a cover plate formed into a cell assembly, and a first filler layer and a second filler layer between the substrate and the cover plate, the first filler layer is closer to the cover plate than the second filler layer, the first filler layer includes liquid crystals and a high molecular polymer, and the second filler layer are liquid crystals.

9 Claims, 5 Drawing Sheets

601 when a light source is turned on, applying a voltage to liquid crystals of any region on the optical waveguide display device, such that a refractive index of the liquid crystals in the any region changes from the first refractive index to the second refractive index, wherein a light emitted from the light source is scattered in the any region and forms light spots on the cover plate

Applying the voltage to the any region on the optical waveguide display device by the electrode on the cover plate, such that the refractive index of the liquid crystals in the any region changes from the first refractive index to the second refractive index

Fig. 6-2

OPTICAL WAVEGUIDE DISPLAY DEVICE, MANUFACTURING METHOD AND DRIVING METHOD THEREOF

CROSS-REFERENCE TO RELATED APPLICATIONS

The present application claims priority to Chinese Patent Application No. 201610658991.1, filed Aug. 11, 2016, and entitled "optical waveguide display device, manufacturing method and driving method thereof", the entire contents of which are incorporated herein by reference.

TECHNICAL FIELD

The present disclosure relates to the field of display technology, and more particularly to an optical waveguide display device, a manufacturing method and driving method thereof.

BACKGROUND

An optical waveguide display device is a display device that transmits light of a light source according to an optical waveguide principle, which may include a substrate and a cover plate formed into a cell assembly, a filler between the substrate and the cover plate, and a light source disposed at sides of the substrate and cover plate. Electrodes are respectively disposed on the substrate and the cover plate to apply a voltage to the filler. The filler may be composed of liquid crystals (LC) and a high molecular polymer. The refractive index of the liquid crystals when a voltage is applied thereto is different from that of the liquid crystals when the voltage is not applied thereto, and the refractive index of the liquid crystals when the voltage is not applied thereto is the same as that of the high molecular polymer (which is greater than a refractive index of a glass).

A display region of the optical waveguide display device may be composed by a plurality of sub-regions. When some sub-regions emit light and other sub-regions do not emit light, the display region can display an image. In the related art, the light source injects light into the cover plate at an angle greater than a critical angle of the filler with respect to the cover plate (usually glass). When a certain sub-region is controlled such that it does not emit light, the voltage is not applied to the liquid crystals of such sub-region through the electrodes on the substrate and the cover plate. At this time, the incident light may pass through the liquid crystals and the high molecular polymer before it is directed to the cover plate. Since the refractive indexes of the liquid crystals and the high molecular polymer of such sub-region are the same, and greater than the refractive index of the glass, a propagation direction of the incident light after passing through the liquid crystals and high molecular polymer will not change. When the incident light reaches the cover plate, the incident light satisfies the condition of total reflection, such that total reflection may occur on the cover plate, thus such sub-region does not emit light. When a certain sub-region is controlled such that it emits light, the voltage may be applied to the liquid crystals of such sub-region through the electrodes on the substrate and the cover plate. Since the refractive index of the liquid crystals of such sub-region changes after the voltage is applied to the liquid crystals of such sub-region, when the incident light passes through the liquid crystals and reaches the high molecular polymer, the refractive index of the liquid crystals is different from that of the high molecular polymer. Thus the light passing through the liquid crystals of such sub-region may be refracted on the high molecular polymer, finally emit to the cover plate, and form a light spot on the cover plate. The incident angle of the light spot is not greater than the critical angle of the filler with respect to the cover plate, cannot be totally reflected on the cover plate, and may be emitted from the cover plate, such that the sub-region emits light.

In the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture.

SUMMARY

In order to solve the following problem, i.e. in the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture, embodiments of the present disclosure provide an optical waveguide display device, a manufacturing method and driving method thereof. The technical solutions are as follows.

According to a first aspect of the present disclosure, an optical waveguide display device is provided, which includes:

a substrate and a cover plate formed into a cell assembly, and a first filler layer and a second filler layer between the substrate and the cover plate, the first filler layer is closer to the cover plate than the second filler layer, the first filler layer includes liquid crystals and a high molecular polymer, the second filler layer are liquid crystals, the liquid crystals in the first filler layer and the liquid crystals in the second filler layer have a first refractive index when a voltage is not applied thereto, and have a second refractive index when the voltage is applied thereto, the high molecular polymer has the first refractive index when the voltage is applied thereto or not applied thereto, and the first refractive index is different from the second refractive index.

According to a second aspect of the present disclosure, a manufacturing method of an optical waveguide display device is provided, which includes:

preparing a cover plate and a substrate;

forming the cover plate and the substrate into a cell assembly to form a first filler layer and a second filler layer between the substrate and the cover plate, wherein the first filler layer is closer to the cover plate than the second filler layer, the first filler layer comprises liquid crystals and a high molecular polymer, the second filler layer are liquid crystals, the liquid crystals in the first filler layer and the liquid crystals in the second filler layer have a first refractive index when a voltage is not applied thereto, and have a second refractive index when the voltage is applied thereto, the high molecular polymer has the first refractive index when the voltage is applied thereto or not applied thereto, and the first refractive index is different from the second refractive index.

According to a third aspect of the present disclosure, wherein a driving method of an optical waveguide display device is provided, which is used to drive the optical waveguide display device comprising a substrate and a cover plate formed into a cell assembly, and a first filler layer and a second filler layer between the substrate and the cover plate, the first filler layer is closer to the cover plate than the second filler layer, the first filler layer includes liquid crystals and a high molecular polymer, the second filler layer are liquid crystals, the liquid crystals in the first filler layer and the liquid crystals in the second filler layer have a first refractive index when a voltage is not applied thereto, and have a second refractive index when the voltage is applied thereto, the high molecular polymer has the first refractive index when the voltage is applied thereto or not applied thereto, and the first refractive index is different from the second refractive index, the method comprising:

when a light source is turned on, applying a voltage to liquid crystals of any region on the optical waveguide display device, such that a refractive index of the liquid crystals in the any region changes from the first refractive index to the second refractive index, wherein a light emitted from the light source is scattered in the any region and forms a light spot on the cover plate.

BRIEF DESCRIPTION OF THE DRAWINGS

In order to more clearly illustrate the technical solution in the embodiments of the present disclosure, the drawings, which are intended to be used in the description of the embodiments, will be briefly described below. It will be apparent that the drawings in the following description are merely examples of the present disclosure, and other drawings may be obtained by those skilled in the art without making creative work.

FIG. 2-1 is a structural schematic diagram of an optical waveguide display device according to an embodiment of the present disclosure;

FIG. 2-2 is a schematic diagram of light spots formed by the optical waveguide display device in the embodiment shown in FIG. 2-1;

FIG. 3-1 is a structural schematic diagram of another optical waveguide display device according to an embodiment of the present disclosure;

FIG. 3-2 is a structural schematic diagram of another optical waveguide display device according to an embodiment of the present disclosure;

FIG. 6-1 is a flow chart of a driving method of an optical waveguide display device according to the present disclosure;

FIG. 6-2 is a flow chart of an implementation of the driving method shown in FIG. 6-1.

Throughout the above figures, specific embodiments of the present disclosure have been shown, which will be described in more detail later. These drawings and literal description are not intended to limit the scope of the present disclosure in any forms, but rather to provide those skilled in the art with the concepts of the present disclosure by reference to specific embodiments.

DETAILED DESCRIPTION

In order to that the objects, technical solutions and advantages of the present disclosure become more clear, the implementations of the present disclosure will be described in further detail below in conjunction with the accompanying drawings.

Figure 1:
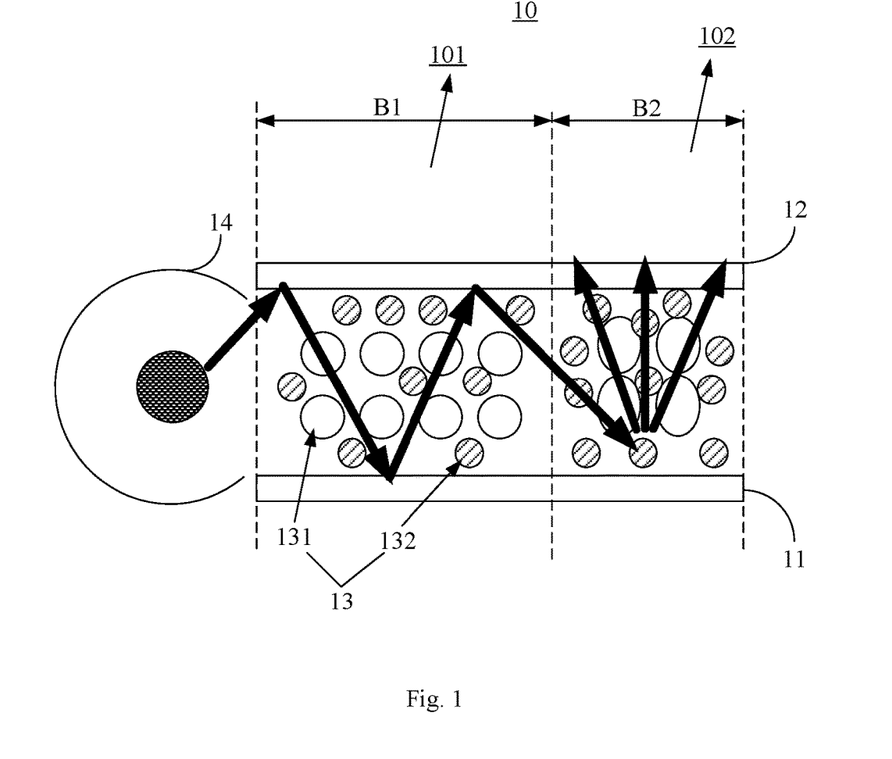
FIG. 1 is a structural schematic diagram of an optical waveguide display device in a related art.

As shown in FIG. 1, in the related art, there is an optical waveguide display device 10. The optical waveguide display device 10 may include an array substrate 11 and a cover plate 12 formed into a cell assembly, a filler 13 between the array substrate 11 and the cover plate 12, and a light source 14 disposed at sides of the array substrate 11 and the cover plate 12. The filler 13 may be composed of liquid crystals 131 and a high molecular polymer 132. A refractive index of the liquid crystals 131 when a voltage is not applied thereto is different from the refractive index of the liquid crystals 131 when a voltage is applied thereto, and is the same as a refractive index of the high molecular polymer 132 (which is greater than a refractive index of a glass). A display region of the optical waveguide display device 10 may be composed of a plurality of sub-regions. When some sub-regions emit light and other sub-regions do not emit light, the display region can display an image. In the related art, the light source 14 emits light into the cover plate 12 (or the array substrate 11) at an angle greater than a critical angle of the filler 13 with respect to the cover plate 12 (usually glass) when the voltage is not applied.

When a certain sub-region B1 (which is shown with a reference numeral 101 in FIG. 1) is controlled such that it does not emit light, the voltage may be not applied to the liquid crystals 131 of the sub-region B1. At this time, the incident light may pass through the liquid crystals 131 and the high molecular polymer 132 before it is directed to the cover plate 12. Since the refractive indexes of the liquid crystals 131 and the high molecular polymer 132 of the sub-region B1 are the same, and greater than the refractive index of the glass, a propagation direction of the incident light after passing through the liquid crystals 131 and the high molecular polymer 132 will not change. When the incident light reaches the cover plate 12, the incident light satisfies the condition of total reflection, such that total reflection may occur on the cover plate 12, thus the sub-region B1 does not emit light. When a certain sub-region B2 (which is shown with a reference numeral 102 in FIG. 1) is controlled such that it emits light, the voltage may be applied to the liquid crystals 131 of the sub-region B2. Since the refractive index of the liquid crystals 131 of the sub-region B2 changes after the voltage is applied to the liquid crystals 131 of the sub-region B2, when the incident light passes through the liquid crystals 131 and reaches the high molecular polymer 132, the refractive index of the liquid crystals 131 is different from that of the high molecular polymer 132. Thus the light passing through the liquid crystals 131 may be refracted on the high molecular polymer 132, and is finally refracted to the cover plate 12, such that the incident angle of part of light reached the cover plate 12 is not greater than the critical angle of the filler with respect to the cover plate. That is, the incident light reached the cover plate does not satisfy the condition of total reflection, such that total reflection cannot occur on the cover plate 12 and light can be emitted from the cover plate 12, thus the sub-region B2 emits light.

In the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture.

Figure 21:
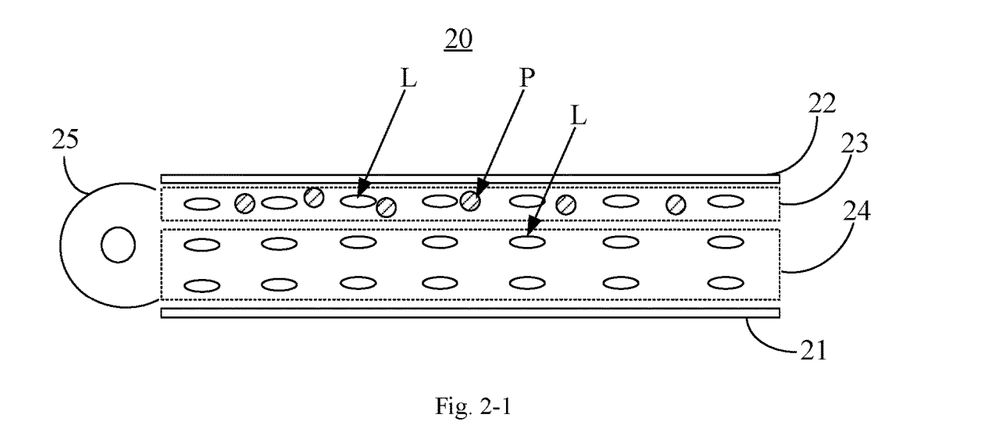

FIG. 2-1 is a structural schematic diagram of an optical waveguide display device according to an embodiment of the present disclosure. The optical waveguide display device 20 may include:

a substrate 21 and a cover plate 22 formed into a cell assembly, and a first filler layer 23 and a second filler layer 24 between the substrate 21 and the cover plate 22, the first filler layer 23 being closer to the cover plate 22 than the second filler layer 24. The cover plate 22 may be made of a transparent material, and the refractive index of a side of the cover plate 22 close to the first filler layer 23 is smaller than the first refractive index. The substrate 21 may be an array substrate, and the refractive index of a side of the substrate 21 close to the second filler layer 24 is smaller than the first refractive index.

The first filler layer 23 includes liquid crystals L and a high molecular polymer P. The second filler layer 24 is liquid crystals L. The liquid crystals L in the first filler layer 23 and the liquid crystals L in the second filler layer 24 have a first refractive index when a voltage is not applied thereto, and have a second refractive index when the voltage is applied thereto. The high molecular polymer P has the first refractive index when the voltage is applied thereto or not applied thereto, and the first refractive index is different from the second refractive index.

In addition, the optical waveguide display device may further include a light source 25. The light source 25 may be disposed at a side of the optical waveguide display device, and the light source 25 may refer to the light source in the related art shown in FIG. 1.

Figure 22:
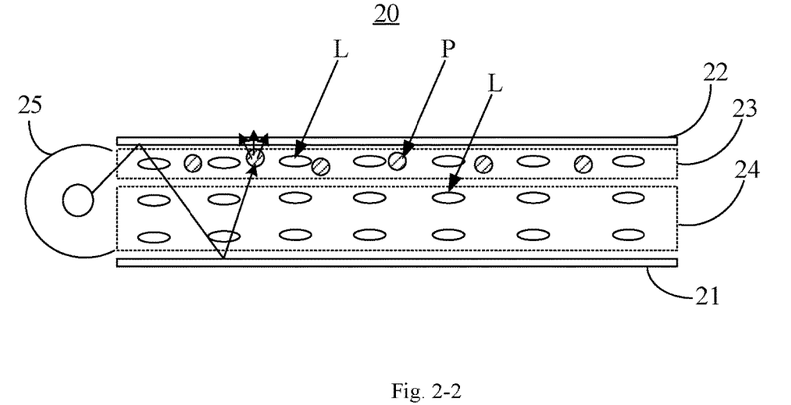

As shown in FIG. 2-2, in the optical waveguide display device according to an embodiment of the present disclosure, when light enters the first filler layer 23 and is scattered, it is closer to the cover plate 22, thus light spots due to the scattering are smaller, and the display accuracy of the optical waveguide display device is higher. The meanings of the reference numerals in FIG. 2-2 may be understood with reference to FIG. 2-1.

In summary, in the optical waveguide display device according to an embodiment of the present disclosure, by disposing the first filler layer including the liquid crystals and the high molecular polymer at a position closer to the cover plate than the second filler, it solves the following problem, i.e. in the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture. The following effects are achieved, i.e. the position where the light spot is generated is closer to the cover plate, the size of the light spot is smaller, and the display accuracy is higher.

Figure 31:
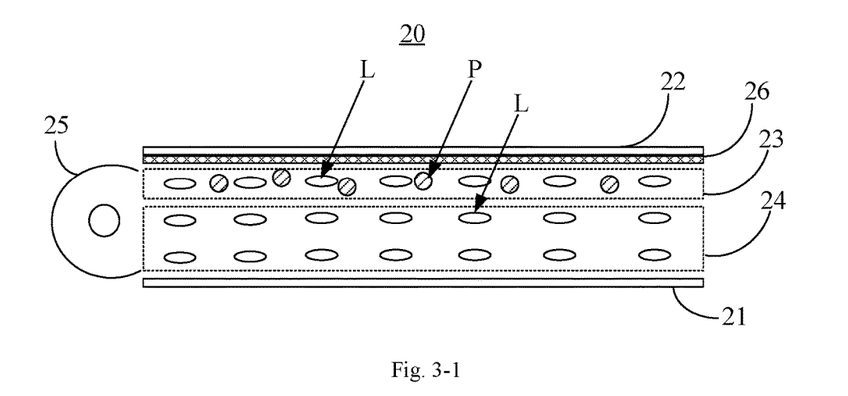

Further, referring to FIG. 3-1, it shows a structural schematic diagram of another optical waveguide display device according to an embodiment of the present disclosure. Based on the optical waveguide display device shown in FIG. 2-1, a more preferable component is added to the array substrate, such that the optical waveguide display device according to an embodiment of the present disclosure has a better performance.

In one embodiment, the optical waveguide display device 20 further includes an electrode 26 for applying a voltage to the liquid crystals in the first filler layer, and the electrode 26 is disposed on the cover plate 22. That is, the optical waveguide display device according to an embodiment of the present disclosure may dispose the electrode only on the cover plate 22, which can only make the refractive index of the liquid crystals close to the cover plate to be changed, and avoid the problem that the changes of the refractive index of the liquid crystals farther from the cover plate affect the display effect.

In one embodiment, the first filler layer 23 is formed on the cover plate which is formed with the electrode 26. The first filler layer 23 is directly formed on the cover plate which is formed with the electrode 26, such that the high molecular polymer can be close enough to the cover plate to further reduce the size of the resulting light spot, and improve the display accuracy of the optical waveguide display device.

Figure 32:
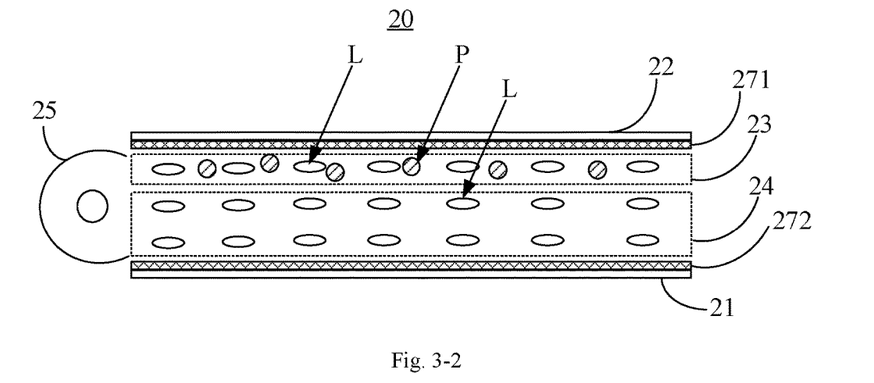

As shown in FIG. 3-2, which is a structural schematic diagram of another optical waveguide display device according to an embodiment of the present disclosure, the optical waveguide display device 20 further includes an electrode 27 for applying a voltage to the liquid crystals between the substrate 21 and the cover plate 22. The electrode 27 includes a first electrode 271 disposed on the cover plate 22 and a second electrode 272 disposed on the substrate. The liquid crystals between the substrate 21 and the cover plate 22 may include liquid crystals in the first filler layer and liquid crystals in the second filler layer. Although the electrodes are disposed on the substrate and the cover plate, since the high molecular polymer only exists in the first filler layer close to the cover plate, the light is not scattered when passing through the liquid crystals in the second filler layer, even if the refractive index of the liquid crystals in the second filler layer is changed. Thus light spots are not generated on the cover plate.

In summary, in the optical waveguide display device provided in the embodiment of the present disclosure, by disposing the first filler layer including the liquid crystals and the high molecular polymer at a position close to the cover plate than the second filler, it solves the following problem, i.e. in the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture. The following effects are achieved, i.e. the position where the light spot is generated is closer to the cover plate, the size of the light spot is smaller, and the display accuracy is higher.

Figure 4:
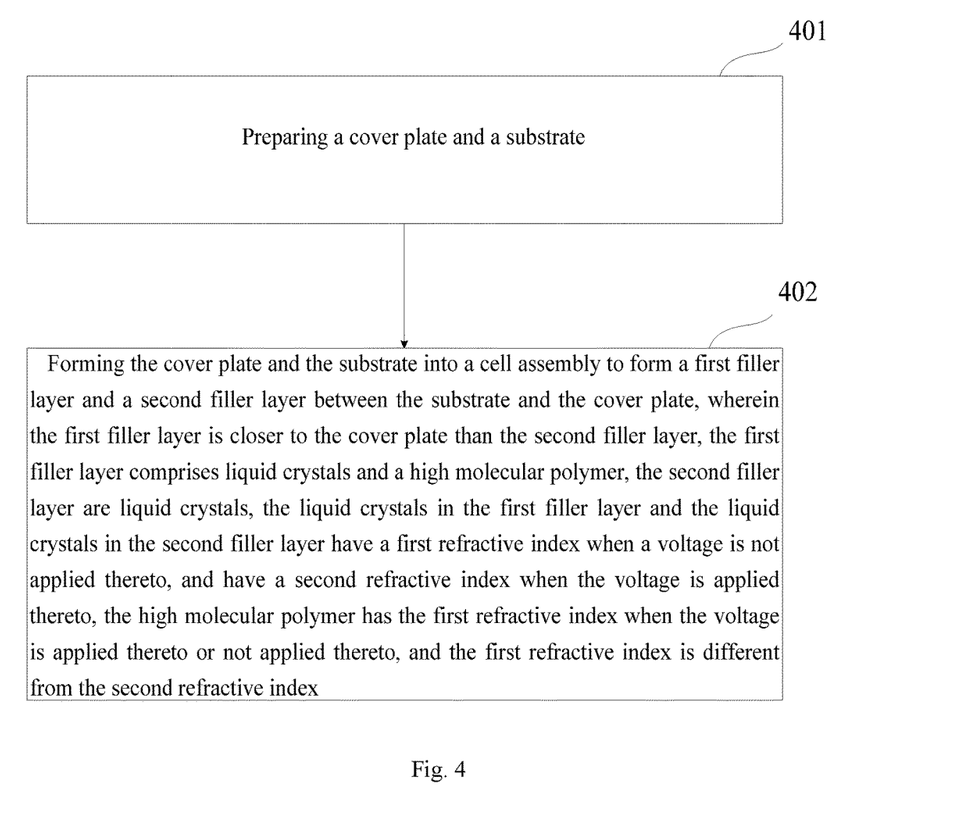
FIG. 4 is a flow chart of a manufacturing method of an optical waveguide display device according to an embodiment of the present disclosure.

FIG. 4 is a flow chart of a manufacturing method of an optical waveguide display device according to an embodiment of the present disclosure. The method includes steps 401 and 402.

At step 401, a cover plate and a substrate are prepared.

At step 402, the cover plate and the substrate are formed into a cell assembly to form a first filler layer and a second filler layer between the substrate and the cover plate, wherein the first filler layer is closer to the cover plate than the second filler layer. The first filler layer includes liquid crystals and a high molecular polymer. The second filler layer is liquid crystals, wherein the liquid crystals in the first filler layer and the liquid crystals in the second filler layer have a first refractive index when a voltage is not applied thereto, and have a second refractive index when the voltage is applied thereto. The high molecular polymer has the first refractive index when the voltage is applied thereto or not applied thereto, and the first refractive index is different from the second refractive index.

In summary, in the manufacturing method of the optical waveguide display device provided in the embodiment of the present disclosure, by disposing the first filler layer including the liquid crystals and the high molecular polymer at a position close to the cover plate than the second filler, it solves the following problem, i.e. in the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture. The following effects are achieved, i.e. the position where the light spot is generated is closer to the cover plate, the size of the light spot is smaller, and the display accuracy is higher.

Figure 5:
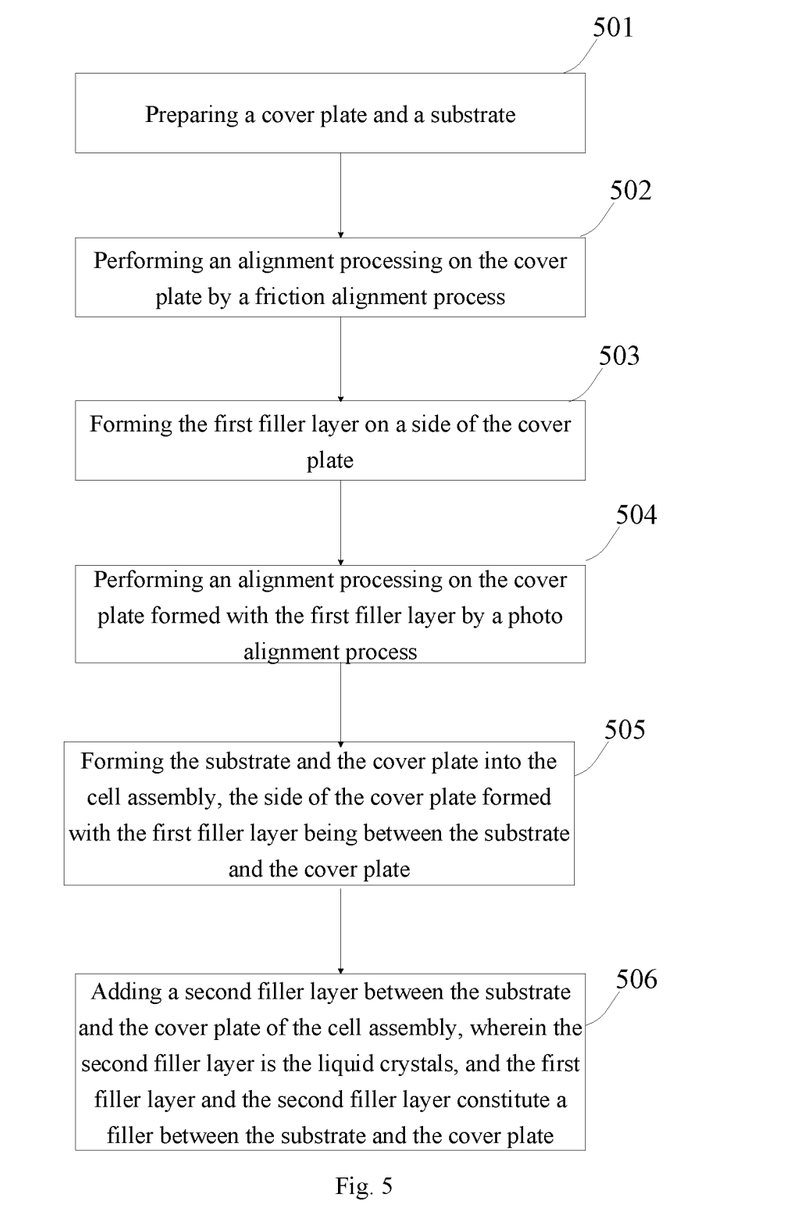
FIG. 5 is a flow chart of a manufacturing method of another optical waveguide display device according to an embodiment of the present disclosure.

FIG. 5 is a flow chart of a manufacturing method of another optical waveguide display device according to an embodiment of the present disclosure. The method includes the following steps.

At step 501, a cover plate and a substrate are prepared.

When using the manufacturing method of the optical waveguide display device provided by the embodiment of the present disclosure, a cover plate and a substrate are firstly prepared. In this embodiment, the cover plate 22 is made of a transparent material, and the refractive index of a side of the cover plate 22 close to the first filler layer 23 is smaller than the first refractive index. The substrate 21 may be an array substrate, and the refractive index of a side of the substrate 21 close to the second filler layer 24 is smaller than the first refractive index.

At step 502, an alignment processing is performed on the cover plate by using a friction alignment process.

After the cover plate and the substrate are prepared, the alignment processing may be performed on the cover plate by using the friction alignment process. The friction alignment process may be found in the related art, which is not described herein. This alignment may be an alignment performed on the liquid crystals in the first filler layer formed later.

At step 503, a first filler layer is formed on a side of the cover plate.

After performing the alignment processing on the cover plate by using the friction alignment process, a first filler layer may be formed on a side of the cover plate, and the first filler layer includes a mixture of the liquid crystals and high molecular polymer. Since the cover plate is subjected to the alignment processing, the liquid crystals in the first filler layer may be aligned.

The process of forming the first filler layer on the side of the cover plate may be completed by coating the mixture of the liquid crystals and the high molecular polymer on the cover plate.

It is to be noted that, an electrode may be disposed on the cover plate before this step, and the electrode is used to apply a voltage to the liquid crystals in the first filler layer.

At step 504, an alignment processing is performed on the cover plate formed with the first filler layer by using a photo alignment process.

After forming the first filler layer, the alignment processing may be performed on the cover plate formed with the first filler layer by using a photo alignment process. The alignment processing may align the liquid crystals in the second filler layer. The photo alignment process may be performed by using ultraviolet (UV), which may be found in the related art, and will be not repeated herein.

At step 505, the substrate and the cover plate are formed into a cell assembly, and a side of the cover plate formed with the first filler layer is between the substrate and the cover plate.

After performing the alignment processing on the cover plate formed with the first filler layer, the substrate and the cover plate are formed into a cell assembly, and the side of the cover plate formed with the first filler layer is between the substrate and the cover plate. When the cell assembly is formed, the substrate and the cover plate may be adhered by using an adhesive. The specific way of forming cell assembly may be found in the related art, and will be not repeated herein.

At step 506, a second filler layer is added between the substrate and the cover plate which are formed into a cell assembly. The second filler layer may be liquid crystals, and the first filler layer and the second filler layer constitute a filler between the substrate and the cover plate.

After forming the substrate and the cover plate into the cell assembly, the second filler layer may be added between the substrate and the cover plate which are formed into the cell assembly. Here, the second filler layer may be liquid crystals. That is, the process of adding the second filler may be a process of injecting the liquid crystals between the substrate and the cover plate which are formed into the cell assembly. The specific way for adding the second filler layer may be found in the related art, and will be not repeated herein.

After this step, a light source may be disposed at sides of the substrate and the cover plate, the specific way thereof may be found in the related art, and will be not repeated herein.

In summary, in the manufacturing method of the optical waveguide display device provided in the embodiment of the present disclosure, by disposing the first filler layer including the liquid crystals and the high molecular polymer at a position close to the cover plate than the second filler, it solves the following problem, i.e. in the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture. The following effects are achieved, i.e. the position where the light spot is generated is closer to the cover plate, the size of the light spot is smaller, and the display accuracy is higher.

Figure 61:
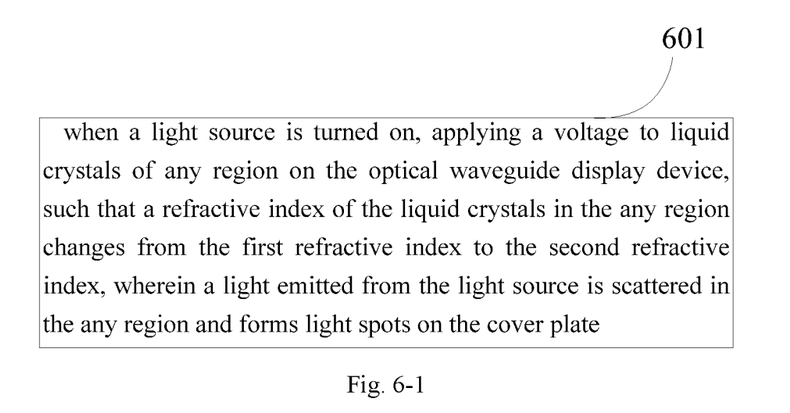

FIG. 6-1 is a flow chart of a driving method of an optical waveguide display device according to the present disclosure, and the driving method is used to drive the optical waveguide display device as provided in FIG. 3-1. The method includes the following steps.

At step 601, when a light source is turned on, a voltage is applied to liquid crystals of any region on the optical waveguide display device, such that a refractive index of the liquid crystals in the any region changes from the first refractive index to the second refractive index, wherein a light emitted from the light source is scattered in the any region and forms light spots on the cover plate.

Any region on the optical waveguide display device may be lightened by using such method. As an example, when the region A on the optical waveguide display device needs to be lightened, a voltage may be applied to the liquid crystals in the region A, such that the refractive index of the liquid crystals in the region A changes from the first refractive index to the second refractive index. The light emitted from the light source is scattered on the region A, and forms light spots on the cover plate. The formed light spots are relatively small.

Compared with the case in the related art that the high molecular polymer exists in the whole filler between the cover plate and the substrate, in the optical waveguide display device of the embodiment of the present disclosure, since the high molecular polymer only exists in the first filler layer close to the cover plate, the light is scattered at the position close to the cover plate, the formed light spots are relatively small, and the display accuracy is higher.

Figure 62:
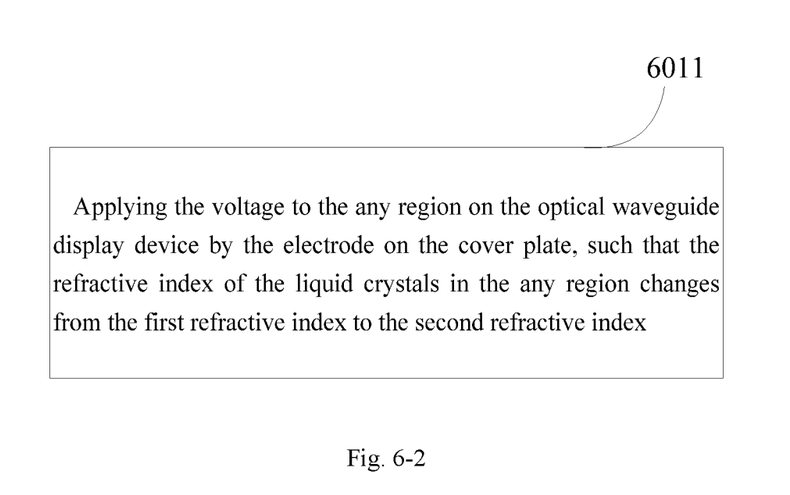

In one embodiment, the optical waveguide display device further includes an electrode for applying a voltage to the liquid crystals in the first filler layer, and the electrode is disposed on the cover plate. As shown in FIG. 6-2, the step 601 includes a sub-step 6011, at which the voltage is applied to the liquid crystals of any region on the optical waveguide display device by the electrode on the cover plate, such that the refractive index of the liquid crystals in any region changes from the first refractive index to the second refractive index.

At the sub-step 6011, the voltage is applied to the filler in any region on the optical waveguide display device by controlling the electrode on the cover plate, such that the refractive index of the liquid crystals in the first filler layer of any region changes from the first refractive index to the second refractive index. Since the electrode is disposed on the cover plate, the liquid crystals farther from the cover plate are less affected by the voltage applied by the electrode. Thus the refractive index of the liquid crystals farther from the cover plate may not be changed by reducing the voltage applied by the electrode, and it is possible to obtain a voltage value at which the refractive index of the liquid crystals in the first filler layer changes and the refractive index of the liquid crystals in the second filler layer does not change by a number of tests.

In summary, in the driving method of the optical waveguide display device provided in the embodiment of the present disclosure, by disposing the first filler layer including the liquid crystals and the high molecular polymer at a position close to the cover plate than the second filler, it solves the following problem, i.e. in the related art, after the light passes through the liquid crystals farther from the cover plate, when the light passes through the high molecular polymer, the resulting light spot due to scattering is larger when it is irradiated onto the cover plate, such that the control accuracy of the optical waveguide display device for this region is decreased, resulting in lower accuracy of the picture. The following effects are achieved, i.e. the position where the light spot is generated is closer to the cover plate, the size of the light spot is smaller, and the display accuracy is higher.

It is to be understood by those of ordinary skill in the art that all or a portion of the steps of implementing the embodiments described above may be accomplished by hardware or by means of the associated hardware instructed by a program that may be stored in a computer readable storage medium. The above-mentioned storage medium may be a read-only memory, a magnetic disk, an optical disk, or the like.

The foregoing are merely specific embodiments of the present disclosure and are not intended to limit the present disclosure. Any modifications, equivalent substitutions, improvements, etc., which are within the spirit and principles of the present disclosure, are to be included within the scope of the present disclosure.

What is claimed is:

1. An optical waveguide display device, comprising a substrate and a cover plate formed into a cell assembly, and a first filler layer and a second filler layer between the substrate and the cover plate, wherein the first filler layer is closer to the cover plate than the second filler layer,
    the first filler layer comprises liquid crystals and a high molecular polymer, the second filler layer are liquid crystals, the liquid crystals in the first filler layer and the liquid crystals in the second filler layer have a first refractive index when a voltage is not applied thereto, and have a second refractive index when the voltage is applied thereto, the high molecular polymer has the first refractive index when the voltage is applied thereto or not applied thereto, and the first refractive index is different from the second refractive index.

2. The optical waveguide display device of claim 1, further comprising an electrode for applying a voltage to the liquid crystals in the first filler layer, and
    wherein the electrode is disposed on the cover plate.

3. The optical waveguide display device of claim 2, wherein the first filler layer is formed on the cover plate formed with the electrode.

4. The optical waveguide display device of claim 1, wherein a refractive index of a side of the cover plate close to the first filler layer is smaller than the first refractive index, and a refractive index of a side of the substrate close to the second filler layer is smaller than the first refractive index.

5. The optical waveguide display device of claim 1, further comprising an electrode for applying a voltage to the liquid crystals between the substrate and the cover plate, and
    wherein the electrode comprises a first electrode disposed on the cover plate and a second electrode disposed on the substrate.

6. A manufacturing method of an optical waveguide display device, the method comprising:
    preparing a cover plate and a substrate;
    forming the cover plate and the substrate into a cell assembly to form a first filler layer and a second filler layer between the substrate and the cover plate, wherein the first filler layer is closer to the cover plate than the second filler layer, the first filler layer comprises liquid crystals and a high molecular polymer, the second filler layer are liquid crystals, the liquid crystals in the first filler layer and the liquid crystals in the second filler layer have a first refractive index when a voltage is not applied thereto, and have a second refractive index when the voltage is applied thereto, the high molecular polymer has the first refractive index when the voltage is applied thereto or not applied thereto, and the first refractive index is different from the second refractive index.

7. The manufacturing method of claim 6, wherein the step of forming the cover plate and the substrate into the cell assembly to form the first filler layer and the second filler layer between the substrate and the cover plate comprises:
    forming the first filler layer on a side of the cover plate;
    forming the substrate and the cover plate into the cell assembly, the side of the cover plate formed with the first filler layer being between the substrate and the cover plate; and
    adding a second filler layer between the substrate and the cover plate of the cell assembly, the second filler layer being the liquid crystals.

8. The manufacturing method of claim 7, wherein before the step of forming the first filler layer on the side of the cover plate, further comprising:

performing an alignment processing on the cover plate by a friction alignment process.

9. The manufacturing method of claim 7, wherein after the step of forming the first filler layer on the side of the cover plate, further comprising:
performing an alignment processing on the cover plate formed with the first filler layer by a photo alignment process.

* * * * *